United States Patent [19]

Steverding

[11] 4,173,187

[45] Nov. 6, 1979

[54] MULTIPURPOSE PROTECTION SYSTEM

[75] Inventor: Bernard Steverding, Guntersville, Ala.

[73] Assignee: The United States of America as represented by the Secretary of the Army, Washington, D.C.

[21] Appl. No.: 670,524

[22] Filed: Sep. 22, 1967

[51] Int. Cl.² .............................................. F42B 11/00
[52] U.S. Cl. .............................. 102/105; 244/117 A; 244/163; 252/478; 343/872
[58] Field of Search ........ 102/105; 250/108, 108 WS; 343/872; 252/478; 117/88; 106/67; 244/177 A, 163

[56] References Cited

U.S. PATENT DOCUMENTS

| | | | |
|---|---|---|---|
| 1,602,688 | 10/1926 | Lindsay | 252/478 |
| 2,641,561 | 6/1953 | Black | 343/872 |
| 2,807,727 | 9/1957 | Fermi et al. | 252/478 |
| 2,859,163 | 12/1957 | Ploetz et al. | 252/478 |
| 2,956,281 | 10/1960 | McMillan et al. | 343/872 |
| 2,962,717 | 11/1960 | Kofoid | 343/872 |
| 3,041,202 | 6/1962 | Whitehurst | 117/88 |
| 3,152,548 | 10/1964 | Schwartz | 102/105 |
| 3,292,544 | 12/1966 | Caldwell et al. | 343/872 |

*Primary Examiner*—Harold Tudor
*Attorney, Agent, or Firm*—Nathan Edelberg; Robert P. Gibson; James T. Deaton

[57] ABSTRACT

Slip cast, fused silica shields such as radomes and antenna windows with their pores filled with graded-Z radiation absorbing particles, give protection against radiation damage, improve the ablation characteristics and do not impair the microwave properties of the shielding.

10 Claims, 2 Drawing Figures

MULTIPURPOSE PROTECTION SYSTEM

DEDICATORY CLAUSE

The invention described herein may be manufactured, used, and licensed by or for the Government for governmental purposes without the payment to me of any royalty thereon.

BACKGROUND OF THE INVENTION

This invention relates to an improved shield for a reentry vehicle, and particularly to one made of fused silica.

Present shields for atmospheric reentry vehicles make use of a low atomic number (Z) material. The low atomic number of the material guarantees good ablative properties and a low radar cross-section. However, heat shields of low atomic number do not provide effective protection against radiation bursts from hot nuclear devices. These recently developed nuclear devices have increased damage potential.

In order to protect reentry vehicles such as missiles from these new types of damage mechanisms, high atomic number constituents have to be incorporated into the structural shell of the missile.

Fused silica has excellent thermal shock resistance as well as good ablative properties and a high radar transmissivity. However, it is a low atomic number material and, as such, cannot be used as a shield.

Accordingly, it is the principal object of this invention to provide an improved shield for use in reentry vehicles, which shield will protect the vehicle from radiation damage, and which will also have improved ablation characteristics and improved microwave properties.

It is a particular object of this invention to provide such a shield made of fused silica.

SUMMARY OF THE INVENTION

It has been discovered that slip cast, fused silica shields, the pores of which are filled with graded-Z radiation absorbing particles, give protection against radiation damage, improve the ablation characteristics and do not impair the microwave properties of the shielding.

BRIEF DESCRIPTION OF THE DRAWING

These and other objects and attendant advantages of this invention will become more readily apparent and easily understood by reference to the following detailed description, of which the accompanying drawing forms an integral part thereof. In the drawing.

DESCRIPTION OF THE PREFERRED EMBODIMENTS

Fused silica has excellent thermal shock resistance, good ablative properties and high radar transmissivity. It has been discovered that by certain modifications it may also become an efficient shielding material for hot radiation pulses.

Figure 1:
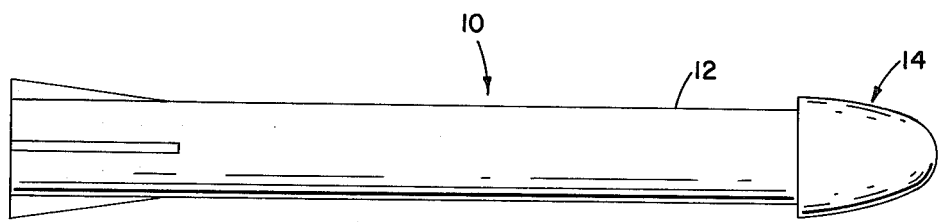
FIG. 1 is a schematic representation of a missile employing a shield of this invention.
Figure 2:
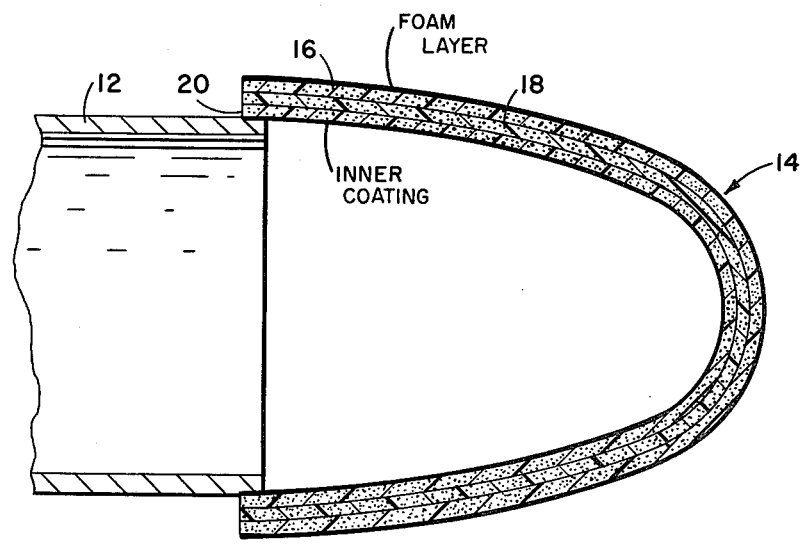
FIG. 2 is a cross-sectional view of the front portion of the missile of FIG. 1 taken along the central axis thereof.

Fused silica is porous. Graded-Z absorbing particles, of a somewhat smaller diameter than the average pore size, may be introduced into the pores so that they are loosely attached to silica grains used as a shield in missiles. A sudden thermal expansion of a high atomic number radiation absorbing particle will therefore not induce a mechanical shock in the silica matrix. However, care must be taken that the high atomic number particle does not evaporate and fill the pores with vapors of high pressure. In order to prevent evaporation, the following arrangement is preferred:

Referring now to FIG. 1, a missile 10 has a structural shell 12 and a nose cone portion 14. Attached to most of shell 12 (or, if desired, only the nose cone portion 14 thereof) is a three-layered (layers 16, 18 and 20) fused silica shield.

In the outer layer 16 of the fused silica shield, particles of high refractoriness, high heat capacity, low vapor pressure and high thermal emissivity are introduced into the pores of the silica grains. Oxides are generally not suitable because they alloy with the silica in the fabrication process and increase the shock sensitivity thereof. However, refractory metals, carbides, borides, beryllides and nitrides are suitable if the atomic number of the metal is from (and including) 20 to (and including) 28. Accordingly, the terms "from" and "to" are defined herein to include the extremes.

In the intermediate layer 18, particles of similar characteristics but with increased atomic number are loaded. The atomic number of the metal should be from 30 (as defined herein) to (as defined herein) 45.

The inner layer 20 includes high atomic number particles. The atomic number should be at least 50. This layer absorbs the hard radiation which is passed on through the outer lower atomic number particles.

If necessary, an additional innermost coated layer of a substantially pure high-Z material may also be employed (on the inner surface of the inner layer 20 of particles absorbed in silica). This insures that any energy unabsorbed by the outer layers will be absorbed before reaching the interior of the missile. The preferred materials for this purpose are hafnium oxide and/or thorium oxide.

This protection system has the following advantages:

(1) Thermal gradients in the material are reduced due to graded absorption of radiation.

(2) The untreated silica matrix can withstand a tremendous thermal shock but is sensitive to mechanical shock. By the loose incorporation of absorbing particles in the pores, minimal mechanical shock will be exerted and evaporation is prevented by the graded absorption.

(3) The particles improve the ablation characteristics of the silica because they increase the viscosity of the liquid film.

(4) The particles do not decrease the favorable microwave properties of the silica-coated reentry vehicle.

The fused silica should be of sufficient porosity to accept the particles loaded therein. The preferred porosity is about 15 percent. Additionally, the holes in the porous silica should be large enough to accept the particles. If these conditions are met, the silica ingredients, including the particles to be loaded, are mixed to form a powder prior to slip casting. If these conditions are not met, the absorbing particles are incorporated in the fused silica mix after coating them with a volatile coating such as cellulose and firing them. When fired, the coated particles form their own pores.

The layers of silica are bonded to each other by slip casting or other conventional manner well known to those skilled in the art. The missile structural shell is made of an ablative material well known to those skilled in the art. The shell is bonded to the silica matrix by any conventional means.

If the pure metal powder (rather than a compound thereof) is used in the inner, intermediate or outer layer, it should be used preferably in only one of these layers, with a compound thereof being used in the other two layers.

This invention is useful in a multi-purpose protection system as a shield for reentry vehicles, such as radomes or antenna windows. To cope with the problems of a cold radiation attack, a foamed (distended) plastic layer, 1 cm. thick, is placed over the silica dome. This foam layer also facilitates the handling of the brittle material. Examples of this foam layer are a non-charring organic plastic such as polytetrafluoroethylene (or similar organic material), C. or an inorganic material such as foamed fused silica.

I claim:

1. A fused silica matrix shield for a missile structural shell and having incorporated therein at least two layers of radiation absorbing particles, said layers including an inner layer and an outer layer of said particles, said particles comprising materials selected from the group consisting of refractory metals, carbides, borides, beryllides and nitrides, the atomic number of the metal component of said material of said inner layer being greater than the atomic number of the metal component of said material of said outer layer.

2. The shield of claim 1 wherein said shield additionally comprises an innermost layer of a substantially pure high atomic weight material selected from compositions containing at least one element having an atomic number ranging from about 72, to about 90, said innermost layer being located on the inner surface of said inner layer.

3. The shield of claim 2 wherein said high atomic weight material is selected from hafnium oxide and thorium oxide.

4. The shield of claim 3 additionally comprising an outermost layer selected from foamed plastic and carbon, said outermost layer being located outside said outer layer.

5. The shield of claim 1 additionally comprising an intermediate layer of radiation absorbing particles, said intermediate layer being located between said inner layer and said outer layer, said particles of said intermediate layer comprising a material selected from the group consisting of a refractory metal, carbides, borides, beryllides, and nitrides, the atomic number of the metal component of said material of said intermediate layer being greater than the atomic number of said metal component of said outer layer, and less than said atomic number of said metal component of said inner layer.

6. The shield of claim 5 wherein said metal component of said material of said outer layer has an atomic number from 20 to 28, said metal component of said material of said intermediate layer has an atomic number from 30 to 45, and said metal component of said material of said inner layer has an atomic number of at least 50.

7. The shield of claim 6 additionally comprising an inner-most layer of a substantially pure high atomic weight material selected from compositions containing at least one element having an atomic number ranging from about 72 to about 90, said innermost layer being located on the inner surface of said inner layer.

8. The shield of claim 7 wherein said high atomic weight material is selected from hafnium oxide and thorium oxide.

9. The shield of claim 8 additionally comprising an outermost layer selected from foamed plastic and foamed silica, said outermost layer being located outside said outer layer.

10. The shield of claim 9 wherein said outermost layer is a foamed plastic, said plastic comprising polytetrafluorethylene.

* * * * *